United States Patent [19]

Gavin

[11] 4,268,484
[45] May 19, 1981

[54] APPARATUS FOR EFFECTING LIQUID-LIQUID CONTACT IN A PLURALITY OF STAGES

[75] Inventor: Edward Gavin, Wimborne, England

[73] Assignee: Davy International (Minerals & Metals) Ltd., Cleveland, England

[21] Appl. No.: 63,089

[22] Filed: Aug. 2, 1979

[30] Foreign Application Priority Data

Aug. 4, 1978 [GB] United Kingdom ............. 32231/78
Jan. 29, 1979 [GB] United Kingdom ............. 03033/79

[51] Int. Cl.³ .......................................... B01D 11/04
[52] U.S. Cl. ...................................... 422/259; 423/8
[58] Field of Search ............................. 422/256–260, 422/140; 423/8–10; 210/21, 296, 511

[56] References Cited

U.S. PATENT DOCUMENTS

| | | | |
|---|---|---|---|
| 2,701,753 | 2/1955 | Eisenlohr et al. | 422/258 X |
| 2,893,846 | 7/1959 | Wistrich et al. | 422/260 X |
| 3,013,866 | 12/1961 | Samaniego et al. | 422/259 X |
| 3,143,395 | 8/1964 | Milmore | 422/258 X |
| 3,811,844 | 5/1974 | Dunmyer, Jr. et al. | 422/257 |

Primary Examiner—William A. Cuchlinski, Jr.
Attorney, Agent, or Firm—Bernard & Brown

[57] ABSTRACT

A compact, multi-stage, co- or counter-current liquid-liquid extraction apparatus is described having two or more stages. Each stage lies adjacent at least one other stage and comprises a mixing chamber having an agitator mounted therein, upper and lower settling chambers, and upper and lower bafffles between the mixing chamber and the upper and lower settling chambers respectively. Vertical partitions at the corners of each stage strengthen the structure and divide off preferably triangular compartments which act as downcomers or risers as appropriate for the liquid media. The liquid media to be contacted in each stage are supplied to the mixing chamber from which dispersion flows upwardly and downwardly into the upper and lower baffles. Disengaged lighter medium flows out from the upper settling chamber over a weir to the next stage, while disengaged heavier medium flows out of the lower settling chamber of one stage to the corresponding next stage. In one form the disengaged heavier medium also overflows a corresponding weir to pass on to the next stage. In another form the disengaged heavier phase passes under an underflow weir to the next stage. In operation a 1:1 phase ratio of the dispersion in the mixing chambers can be maintained despite a different (e.g. 10:1) feed rate ratio of the liquid media to the apparatus.

9 Claims, 13 Drawing Figures

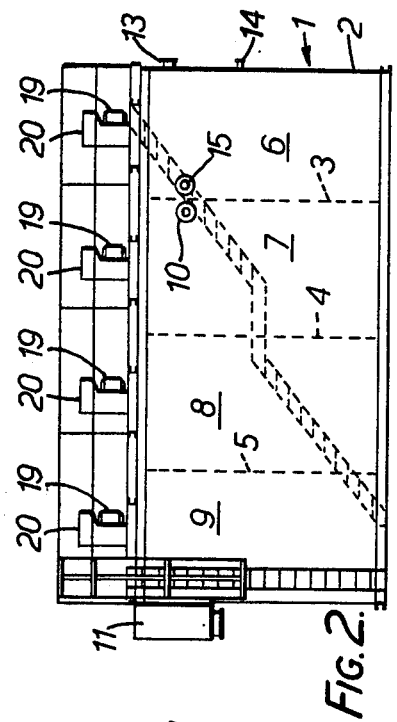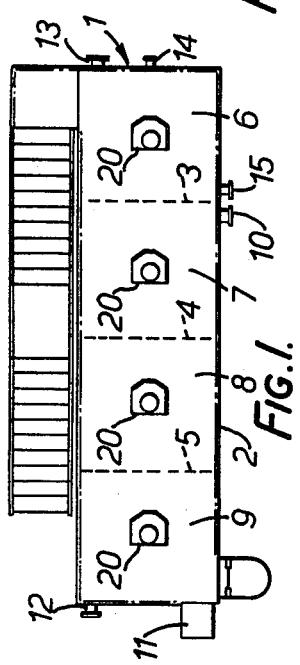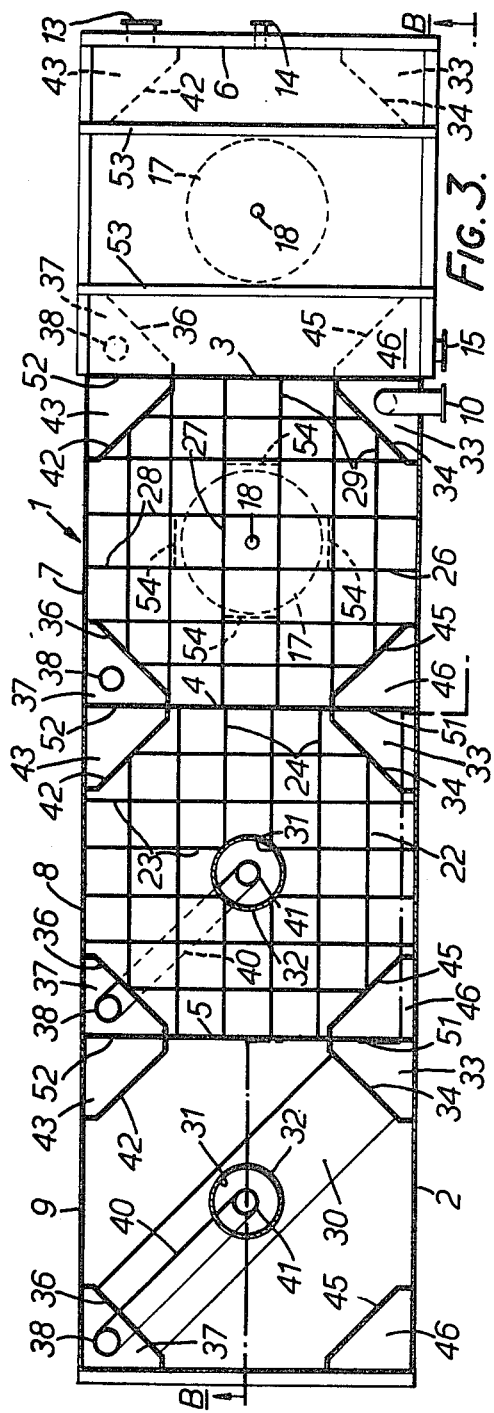

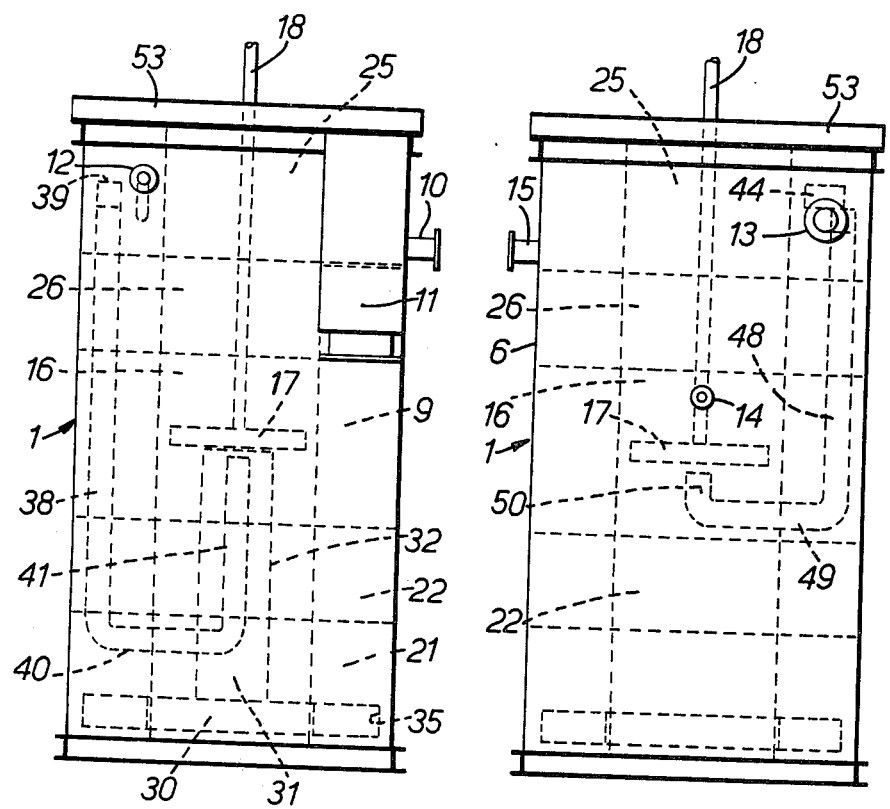

APPARATUS FOR EFFECTING LIQUID-LIQUID CONTACT IN A PLURALITY OF STAGES

This invention relates to an apparatus for effecting liquid-liquid contact in a plurality of stages between an aqueous liquid medium and an organic hydrophobic liquid medium capable of undergoing mass transfer with the aqueous medium.

Liquid-liquid extraction, or solvent extraction as it is often termed, is a widely used process in the chemical and metallurgical industries. Conventional equipment for this purpose generally comprises one or more mixer-settlers arranged in series. In a multi-stage liquid-liquid extraction process a plurality of mixer-settlers will be connected in series; in such a process the two media may flow in co-current from one mixer-settler to the other, but more often than not the two media pass in counter-current one to another through the extraction plant.

Conveniently a mixer-settler comprises a mixer compartment to which the two media are fed and which contains an impeller designed to form a "primary dispersion" of the liquid media one within the other. In such a "primary dispersion" the globules of the dispersed phase are of a size, typically larger than about 100 micrometers in diameter, such that simply on standing under gravity the dispersion disengages into its two constituent phases. The formation of "secondary dispersions" containing smaller globules of dispersed phase, for example with a diameter of about 20 micrometers or less, is to be avoided. From the mixer compartment the dispersion passes into a separate settling compartment in which the phases are allowed to disengage and from which the disengaged phases pass on, e.g. to the next extraction stage.

In order to optimise mass transfer between the phases it is usual to select a phase ratio approaching 1:1 by volume in the mixer compartment. It is unusual to operate the mixer at phase ratios outside the range of from about 5:1 to about 1:5, and more usually the feeds of the two phases to the mixer are controlled to produce a phase ratio of about 2:1 to about 1:2 within the mixer compartment.

The nature of the extraction process may require, however, that in the overall extraction process, the feed rates of the organic hydrophobic medium to the aqueous medium differ markedly from this preferred mixing ratio of about 1:2 to about 2:1. For example, a uranium extraction plant in which a uranium sulphuric acid leach liquor is contacted in a plurality of stages in counter-current with an organic extractant (e.g. a 5% by volume "Alamine 336" solution in kerosene/2.5% by volume isodecanol), may require the feed rates to be in the ratio aqueous:organic of 10:1 by volume. In order to achieve a 1:1 ratio by volume in the mixer of each stage it is necessary to recycle coalesced organic phase to the mixer compartment by means of an external loop in the ratio of 9 volumes of recycled organic phase for every 10 volumes of aqueous feed solution supplied. Hence 20 volumes of dispersion are produced for every 10 volumes of aqueous feed solution supplied and the organic phase must undergo recycle many times. This requires significant energy consumption to effect the necessary recycle of organic phase.

In the settler three layers are formed, i.e. an upper disengaged organic layer, a middle dispersion band and a lower disengaged aqueous layer. For a given settling area there is a limiting rate at which dispersion can be fed to the settler, above which rate the dispersion band depth increases until eventually, the settler becomes flooded with dispersion. Since the rate of disengagement of the phases of the dispersion in the settling compartment is limited by the settler area, the plan area of the settler compartment must be sufficiently large to permit disengagement of 20 volumes of dispersion for every 10 volumes of aqueous sulphuric acid leach liquor supplied in order to prevent flooding of the settler with dispersion. This means that the inventory of organic phase must be correspondingly large and that there is considerable hold up of uranium in the settlers of the plant. Furthermore the settler tanks must be large and must be constructed on site. The cost of the settler tanks and the cost of the solvent inventory both constitute significant factors in terms of erection and running costs of the plant. Also the large surface areas of the settlers represent a considerable fire hazard. The cost of providing fire prevention equipment is also a significant factor in many parts of the world.

The present invention seeks to provide a design of multi-stage liquid-liquid extraction plant with reduced settler area (and hence reduced cost) which can be operated at disparate organic:aqueous feed ratios of, for example, 1:10 whilst maintaining a favourable ratio for mass transfer, for example 1:1, in the mixing chamber without recourse to external recycle of one of the phases.

According to the present invention there is provided apparatus for effecting liquid-liquid contact in a plurality of stages between an aqueous liquid medium and an organic hydrophobic liquid medium capable of undergoing mass transfer with the aqueous liquid medium, comprising:
   a first mixer-settler;
   a second mixer-settler adjacent the first mixer-settler;
      each mixer-settler comprising;
         a mixing chamber;
         agitator means in the mixing chamber for mixing the aqueous and organic hydrophobic liquid media so as to form a dispersion of globules of one medium dispersed in the other, which globules are of a size such that, upon standing under gravity, the dispersion is capable of disengaging substantially completely into two separate layers;
         first conduit means for feeding the lighter medium of the two to the mixing chamber;
         second conduit means for feeding the heavier medium of the two to the mixing chamber;
         an upper settling chamber above the mixing chamber;
         a lower settling chamber below the mixing chamber;
      upper and lower baffle means extending across the mixer-settler so as to divide the mixing chamber from the upper settling chamber and the lower settling chamber respectively, each baffle means being adapted to provide a plurality of flow paths for liquid between the mixing chamber and the respective settling chamber and to permit maintenance in the respective settling chamber of conditions favouring dispersion disengagement despite turbulent mixing conditions in the mixing chamber;
      outlet means for disengaged heavier medium from the lowe settling chamber; and offtake means for disengaged lighter medium from the upper settling chamber;

means for supplying heavier medium to the first mixer-settler communicating with the second conduit means thereof;

means for removing disengaged heavier medium from the second mixer-settler communicating with the outlet means therefrom;

means for supplying lighter medium to one of the first and second mixer-settlers communicating with the first conduit means thereof; and means for removing disengaged lighter medium from the other one of the first and second mixer-settlers communicating with the offtake means thereof;

the outlet means for disengaged heavier medium of the first mixer-settler being arranged to communicate directly with the second conduit means of the second mixer-settler so as to enable disengaged heavier medium from the first mixer-settler to pass directly to the second mixer-settler; and the offtake for lighter medium of the said one mixer-settler comprising a weir for lighter medium between the first and second mixer-settlers which is positioned adjacent the first conduit means of the said other mixer-settler so as to enable disengaged lighter medium to flow from the said one mixer-settler over the weir to the said other mixer-settler.

In the apparatus of this invention the first conduit means extends from a level at which disengaged lighter medium collects in the upper chamber of one stage down through the zone of the upper baffle means to the mixing chamber. In a similar manner the second conduit means extends from a level at which disengaged heavier medium collects in the lower chamber of one stage up through the zone of the lower baffle to the mixing chamber.

In one preferred form of apparatus the first conduit means comprises a first downcomer means, the second conduit means comprises a second downcomer means, the outlet means for disengaged heavier medium comprises a riser, and the riser of the first mixer-settler is arranged to communicate with the second downcomer means of the second mixer-settler over a further weir. In an alternative preferred embodiment, the outlet means for disengaged heavier medium of the first mixer-settler comprises an aperture in the wall of the first mixer-settler through which disengaged heavier medium, in operation, may flow directly into the second conduit means of the second mixer-settler. Such aperture is disposed sufficiently low in the mixer-settler to lie below the settled interface between the media in the inoperative condition of the mixing means and in a zone at which disengaged heavier medium, substantially free of entrained lighter medium, collects in operation of the apparatus. In this latter arrangement the heavier medium follows an underflow path between the first and second mixer-settlers.

When the apparatus is intended for counter-current flow between stages, the offtake means for lighter medium of the second mixer-settler is arranged to discharge over the weir for lighter medium directly into the first conduit means of the first mixer-settler which is appropriately positioned relative thereto. On the other hand, when the apparatus is intended to operate in a co-current regime, the first conduit means of the second mixer-settler is positioned to receive disengaged lighter medium flowing from the first mixer-settler over the weir for lighter medium.

In use of the apparatus the organic hydrophobic medium may be lighter or heavier than the aqueous medium. In a typical multi-stage uranium extraction plant, for example, the organic extractant (e.g. a 5% by volume solution of "Alamine 336" in kerosene/2.5% by volume iso-decanol) will normally be the lighter phase. However, in other form of multi-stage extraction plant, the organic hydrophobic medium may be the heavier medium, particularly if the organic medium contains a solvent, such as chloroform, which has a specific gravity greater than 1.

A preferred form of apparatus according to the invention comprises an elongate tank housing substantially rectangular in plan, said housing comprising a floor, a pair of elongate side walls and a pair of end walls, and said housing is further internally divided by at least one transverse internal wall extending upwardly from said floor and between said side walls so as to form at least two box sections in said housing, each said box section corresponding to a respective mixer-settler. Such box sections are preferably square in plan and may each have vertical partitions across the corners thereof to strengthen the structure and to provide compartments, which can be used as the conduit means, in the corners of the respective mixer-settler section. Such partitions desirably divide off substantially triangular section compartments, preferably at each corner of the respective mixer-settler section. In this arrangement the weir or weirs lies or lie between appropriate compartments of adjacent mixer-settler sections.

An alternative form of apparatus according to the invention comprises a cluster of adjacent mixer-settler sections, each sharing a common wall with at least one other mixer-settler, and each having vertical partitions across the corners thereof serving to divide off compartments which can be used as the conduit means, with the weirs lying between appropriate compartments of adjacent mixer-settler sections. In such a cluster arrangement the sections may be square in plan, or of another shape, for example triangular, pentagonal, or hexagonal in plan.

In order that the invention may be clearly understood and readily carried into effect some preferred embodiments thereof will now be described, by way of example only, with reference to the accompanying drawings, wherein:

FIG. 1 is a top plan view of a uranium solvent extraction plant comprising three extraction stages and a single scrub stage and constructed in accordance with the invention;

FIG. 2 is a side view of the plant of FIG. 1;

FIG. 3 is a horizontal section (on the line A—A of FIG. 4) at various levels through the plant of FIGS. 1 and 2;

FIG. 5 is an end view of the plant of FIGS. 1 to 4 in the direction of the arrow C of FIG. 4;

FIG. 6 is a view of the other end of the plant of FIGS. 1 to 5 looking in the direction of the arrow D of FIG. 4;

Figure 4:
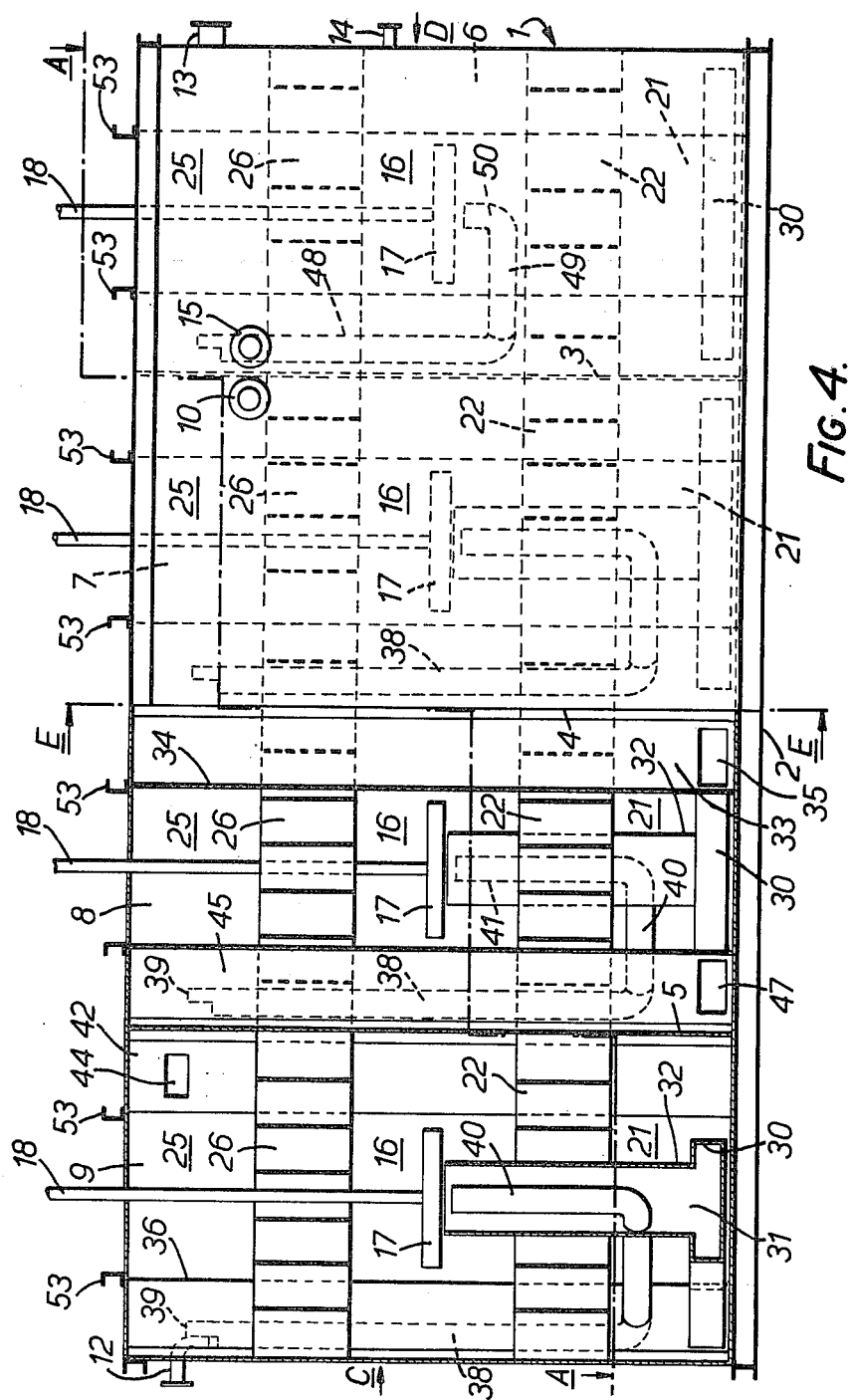
FIG. 4 is a vertical section through the plant of FIGS. 1 to 3 on the line B—B of FIG. 3.

Referring to FIGS. 1 to 8, a uranium solvent extraction plant 1 comprises a tank 2 that is generally rectangular in plan, which is divided internally by three transverse walls 3, 4, 5 so as to provide separate mixer-settler sections comprising a scrub stage 6 and three extraction stages 7, 8, 9. A pregnant uranium leach liquor (e.g. a sulphuric acid leach solution) is supplied to the first extraction stage 7 by means of inlet pipe 10 and flows in turn through first extraction stage 7, second extraction stage 8 and third extraction stage 9. An aqueous raffinate is withdrawn from third extraction stage 9 through offtake 11. An organic extractant (e.g. a 5% by volume "Alamine 336" solution in kerosene/2.5% by volume iso-decanol) is supplied to plant 1 through inlet pipe 12 at approximately one tenth the rate of supply of the aqueous uranium leach liquor through inlet 10. This extractant passes in counter-current through the extraction stages from the third extraction stage 9 to the first extraction stage 7. The now uranium loaded organic liquor then passes on to scrub stage 6, in which it is scrubbed with water, and then finally leaves the plant via outlet 13. Scrub water is supplied to scrub stage 6 via inlet 14 and is removed via outlet 15.

Each of the extraction stages 7, 8 and 9 is constructed as a mixer-settler and is similar in construction to the other extraction stages. Each mixer-settler of the extraction stages, as can perhaps best be seen from FIG. 4, has a mixing chamber 16 with an impeller 17 therein mounted on a vertical shaft 18. A motor 19 (see FIG. 2) is provided on top of each extraction stage for driving shaft 18 through suitable reduction gearing (not shown) in housing 20. Beneath mixing chamber 16 is a lower settling chamber 21; this is separated from mixing chamber 16 by means of a lower horizontal baffle 22 which extends across the extraction stage. As can be seen from FIG. 3, baffle 22 is of the "egg box" type and consists of two sets of plates 23, 24 secured to one another at right angles. Above mixing chamber 16 is an upper settling chamber 25 which is separated therefrom by means of an upper horizontal baffle 26 generally similar in construction to that of lower baffle 22. However, a central portion 27 of upper baffle 26 is removable, as will be described in greater detail below, to permit access to, and servicing of, impeller 17. As with lower baffle 22, upper baffle 26 comprises two sets of parallel plates 28, 29 secured at right angles to one another. Baffles 22 and 26 serve to provide a plurality of pathways for liquid between the mixing chamber 16 and the respective settling chamber 21 or 25. The spacing between adjacent plates of the baffles 22 and 26 and the depth of these baffles are such that they serve to eliminate from liquid entering the respective settling chamber 21 or 25 from mixing chamber 16, most, if not all, of the rotational movement about the axis of shaft 18 produced by impeller 17. In this way liquid enters the settling chambers 21 and 25 in a substantially vertical direction and conditions conducive to disengagement of the phases are established in the settling chambers 21 and 25, despite turbulent mixing conditions in the adjacent mixing chamber 16.

Mounted diagonally across the bottom of each of the extraction stages is an inverted, generally U-section channel 30. This has an aperture 31 in its upper face and a draught tube 32 is mounted over this aperture 31 coaxially with shaft 18. At one end channel section 30 communicates with a downcomer 33 formed by a partition 34 welded across the corner of the mixer-settler. As can be seen from FIG. 4, partition 34 is formed at its lower end with an aperture 35 through which aqueous phase can pass from downcomer 33 into channel 30.

At the corner of each extraction stage diagonally opposite from partition 34 is welded a similar partition 36 forming a compartment 37. A downcomer pipe 38 with an open upper end 39 passed down through compartment 37, bends at its lower end through 90°, passes horizontally as shown at 40 through settling chamber 21 and then passed through the wall of draught tube 32 before bending upwardly through 90° so as to form a second draught tube 41 within draught tube 32 and coaxial therewith. For the avoidance of doubt, it should be noted that compartment 37 does not communicate directly with the interior of channel 30.

Across a third one of the corners of each extraction stage is welded a further partition 42 which forms a further compartment 43. Near the top of riser 43 is an aperture 44 (see FIG. 4) through which disengaged organic phase can flow from upper settling chamber 25 into compartment 43.

A further partition 45 is welded across the remaining corner of each extraction stage so as to form a riser 46. An aperture 47 is provided in partition 45 in order to allow disengaged heavier phase to pass from lower settling chamber 21 into riser 46.

The construction of scrub stage 6 is similar to that of each of the extraction stages 7, 8 and 9 except that it lacks any draught tube 32 for the aqueous phase and has a modified draught tube for the organic phase. In scrub stage 6 like reference numerals are used to designate like parts to thse appearing in extraction stages 7, 8 and 9. Instead of downcomer pipe 38, scrub stage 6 is provided with a vertical pipe 48 having a horizontal portion 49 and an upturned end 50 which is arranged coaxially with the shaft 18 for the impeller 17 of scrub stage 6 so as to form a draught tube for the uranium loaded organic phase to be scrubbed.

Figure 7:
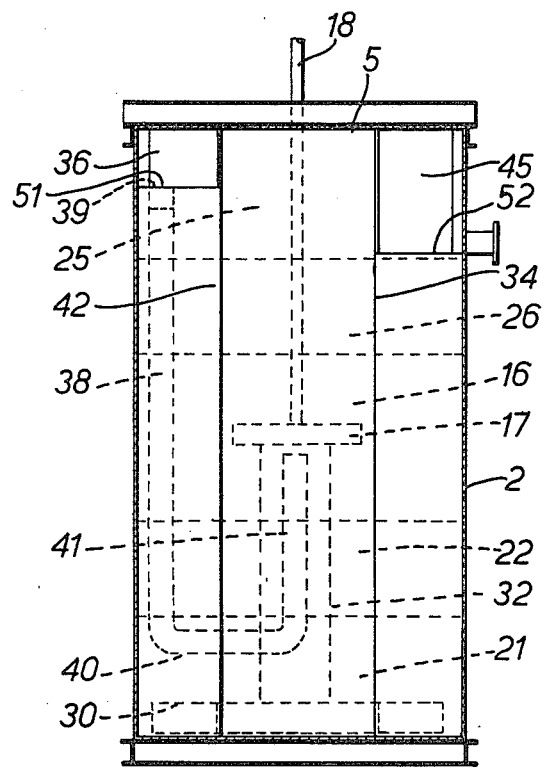
FIG. 7 is a vertical section through the plant of FIGS. 1 to 6 on the line E—E of FIG. 4.

As can be seen from FIG. 7, the wall between each pair of extraction stages, for example the wall 4, is cut away adjacent the longer walls of tank 2 so as to form a weir 51 between riser 46 of first extraction stage 7 and downcomer 33 of second extraction stage 8. Disengaged aqueous medium from first extraction stage 7 can thus flow from riser 46 of one extraction stage to downcomer 33, and hence to the mixing chamber 16, of the next extraction stage. Wall 4 is also cut away adjacent the other longer wall of tank 2 so as to form a weir 52 between compartment 43 of second extraction stage 8 and compartment 37 of first extraction stage 6. In this way disengaged organic medium can flow, in counter-current to the flow of aqueous medium, from the second extraction stage 8 to the first extraction stage 7. Similar weirs 51 and 52 are provided in wall 5. However, as illustrated, wall 3 lacks a weir 51 although having a weir 52.

Figure 8:
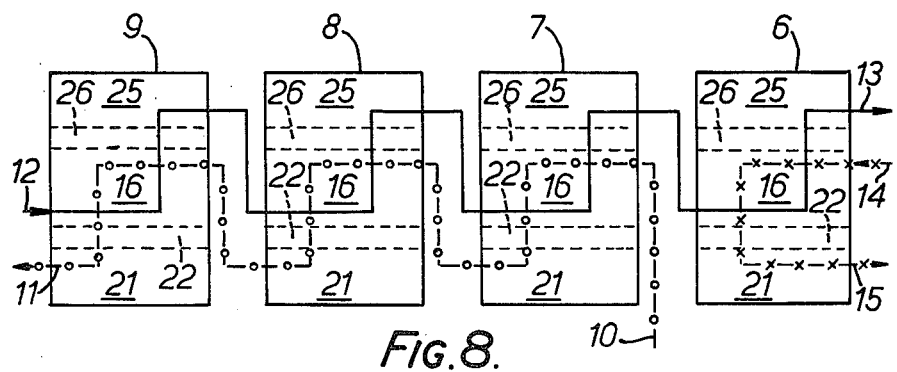
FIG. 8 is a schematic flow sheet of the plant of FIGS. 1 to 7.
Figure 9:
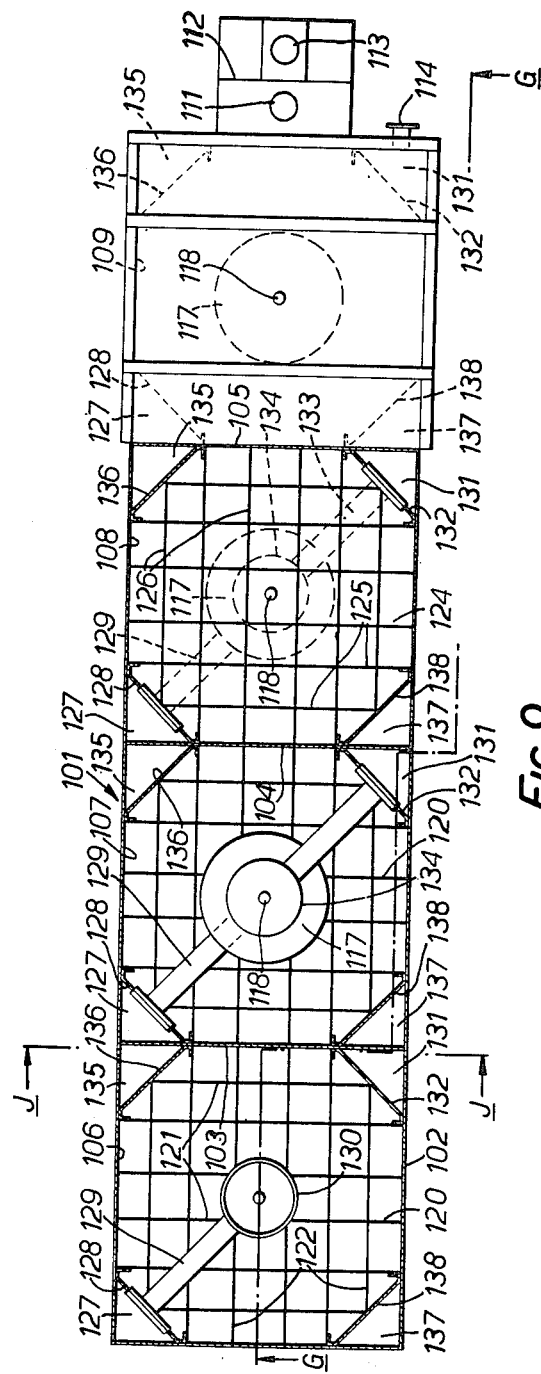
FIG. 9 is a plan view, partly in horizontal section, of a second form of uranium solvent extraction plant comprising four extraction stages and constructed according to the invention, taken on the line F—F of FIG. 10.
Figure 10:
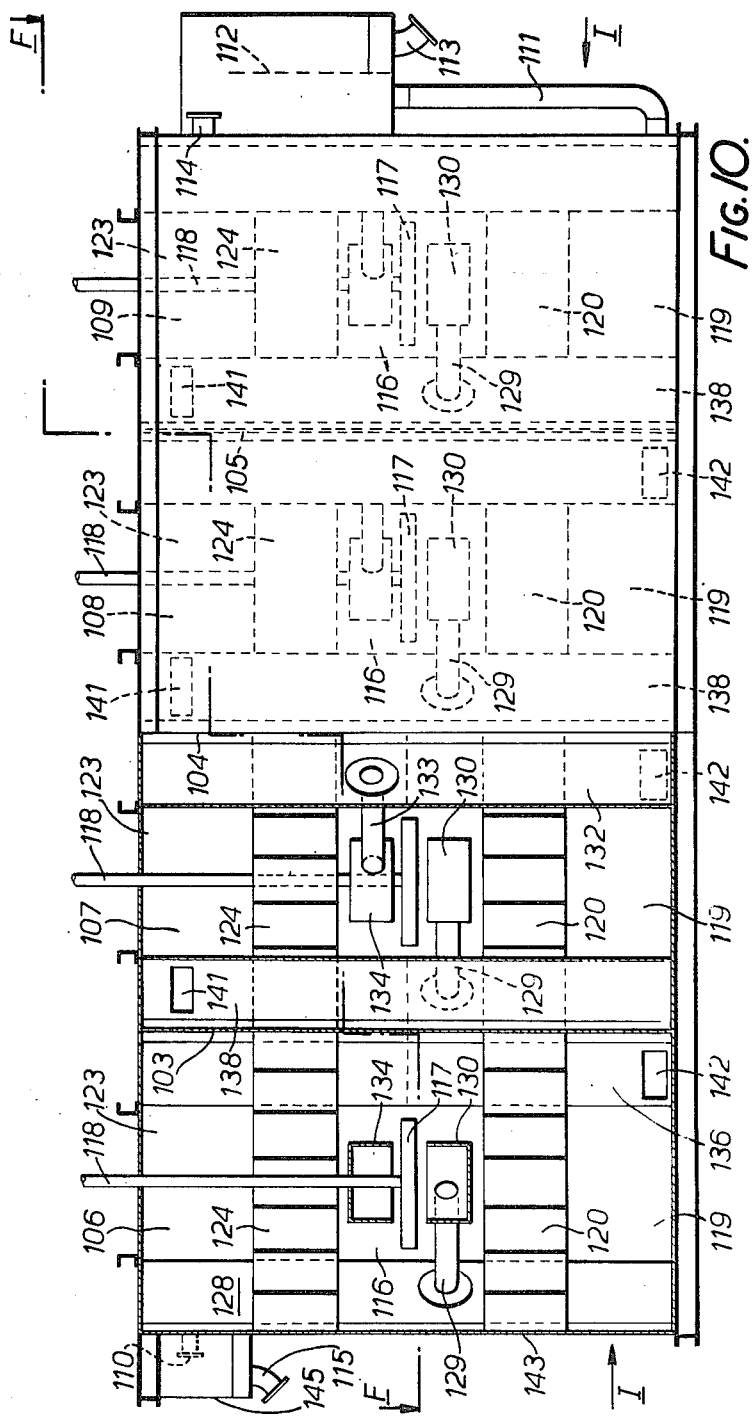
FIG. 10 is a side view, partly in vertical section, of the plant of FIG. 1, taken on the line G—G of FIG. 9.
Figures 11, 12:
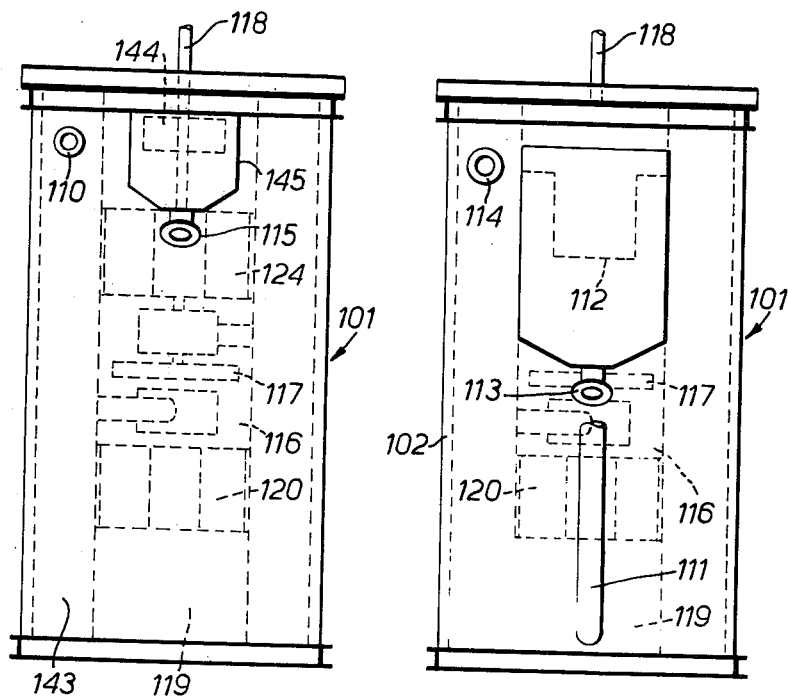
FIG. 11 is an end view of the plant of FIGS. 1 and 2 seen in the direction of arrow H of FIG. 10.
FIG. 12 is a corresponding view of the other end of the plant of FIGS. 9 to 11, seen in the direction of the arrow I of FIG. 10.

FIG. 8 illustrates diagrammatically the flow of the media through the plant 1; the continuous line (—) indicates the path of organic extractant, the line (—o—o—o—) shows the path of aqueous sulphuric acid leach liquor and the line (—x—x—x—) shows the path of scrub water. For the sake of clarity impellers and draught tubes and the detailed construction of the downcomers and risers have been omitted from FIG. 8, whilst the various stages have been shown spaced one from another solely to improve the intelligibility of the diagram; in practice adjacent stages share common walls 3, 4 and 5 as indicated in FIGS. 1 to 7 above.

Each of the drive units, consisting of motor 19 and gear housing 20, is conveniently mounted on a horizontal plate (not shown) which is bolted by means of, for example, 4 bolts (also not shown) to cross members 53. When it is required to gain access to an impeller 17, it is a simple matter to loosen these bolts and lift off the whole drive unit comprising motor 19, gear housing 20, drive shaft 18 and impeller 17. As this drive unit is lifted the removable central portion 27 is caught up by impeller 17 and is removed from the plant 1 together with the drive unit. As indicated at 54 in FIG. 3, small flanges can be provided on the underside of upper baffle 26 to support central portion 27 during normal operation of the plant 1.

In operation of the plant 1, pregnant uranium leach liquor enters first extraction stage 7 through inlet 10 and fills downcomer 33 of first extraction stage 7. It then flows through aperture 35 into channel 30 and up through aperture 31 and draught tube 32 into the "eye" of impeller 17 in mixing chamber 16. Organic phase enters compartment 37 of first extraction stage by passage over weir 51 from compartment 43 of second extraction stage 8, passes down through downcomer pipe 38 through its open upper end 39, through horizontal portion 40, up draught tube 41 and into mixing chamber 16. Impeller 17 serves to disperse the phases one in the other so as to form a so-called "primary dispersion", that is to say a dispersion of globules of one phase in the other of a size such that, on standing under gravity, substantially complete disengagement of the phases occurs. Typically such globules are at least about 100 micrometers in diameter. The presence of "secondary dispersion"-sized globules, i.e. globules which will not disengage on standing under gravity, is to be avoided. "Secondary dispersion"-sized globules are usually about 20 micrometers in diameter or less.

Dispersion passes through baffles 22 and 26 both downwardly and upwardly from mixing chamber 16. Disengagement of the phases occurs in the baffles and/or in the settling chambers 21 and 25. Disengaged heavier phase (i.e. aqueous phase) flows back from baffle 26 into mixing chamber 16, whilst disengaged lighter phase (i.e. kerosene phase) flows back from baffle 22 into mixing chamber 16.

Disengaged kerosne phase collects in upper settling chamber 25 and flows out via aperture 44 into compartment 43 and thence over weir 51 into compartment 37 of scrub stage 6. Disengaged aqueous phase collects in lower settling chamber 21 and passes through aperture 47 into riser 46 and thence over weir 52 into downcomer 33 of seond extraction stage 8.

The flow pattern through second and third extraction stages 8 and 9 is similar.

As illustrated there is no weir corresponding to weir 52 between first extraction stage 7 and scrub stage 6. If desired, however, the plant 1 can be modified by providing such a weir and by omitting outlet 15; in this case the scrub water flows from riser 46 of scrub stage 6 over the corresponding weir into downcomer 33 of first extraction stage 7, therein to commingle with the pregnant leach liquor entering through inlet 10.

As illustrated, the position of the open end 39 of each pipe 38 is fixed. Adjustable sleeves may be provided, if desired, on pipes 38 to permit adjustment of the level of the upper ends 39.

As illustrated in FIG. 4 the upper ends 39 of pipes 38 and the upper end of pipe 48 are each cut away at one side; this design assists in preventing formation of air locks in pipes 38 and 48.

If the impellers 17 are stopped, but feed of the liquors is continued, a clear static interface between the phases will be established within each of the extraction and scrub stages. The height of this static interface will be determined by the relative height of the weirs 51 and 52 and by the densities of the phases. This interface lies in the mixing chamber 16 and its height therein essentially determines the instantaneous volume ratio of the phases in the mixing chamber 16 during operation of the plant under design flow conditions, whatever the feed rate ratio of the phases to the plant 1 may be. This instantaneous volume ratio of the phases substantially corresponds to the phase ratio of the dispersion formed. For optimum operation of the plant 1 this phase ratio should be chosen so as to promote mass transfer between the phases. Preferably the phase ratio lies in the range of from about 1:5 to about 5:1 by volume. Usually it will be preferred to operate at a phase ratio of from about 2:1 to about 1:2, e.g. at about 1:1, by volume since this ratio favours mass transfer and minimises the risk of formation of a "secondary dispersion". It is preferred that the impeller 17 is positioned at about the level of the static interface between the phases.

In the plant of FIGS. 1 to 8 the aqueous and organic media flow directly from one mixer-settler to the next over respective weirs formed between adjacent mixer-settlers by the common wall thereof. The plant of FIGS. 9 to 13 has, in place of a weir for the heavier medium of the two, a direct communiction between adjacent mixer-settlers for disengaged heavier medium by way of an underflow arrangement. This has the advantage that the impellers or other forms of mixing device provided in the mixing chambers for forming the desired dispersion of the media one within the other do not have to provide the necessary hydraulic head to make the disengaged heavier medium pass over its respective weir to the adjacent mixer-settler. Hence the power requirement for the impellers or other mixing devices is reduced in the plant of FIGS. 9 to 13.

Referring to FIGS. 9 to 13, a uranium solvent extraction plant 101 comprises a tank 102 that is generally rectangular in plan, which is divided internally by three transverse walls 103, 104, 105 so as to provide four separate mixer-settler sections each comprising one of the four extraction stages 106, 107, 108, 109. A pregnant uranium leach liquor (e.g. a sulphuric acid leach solution) is supplied to the first extraction stage 106 by means of inlet pipe 110 and flows in turn through the four extraction stages 106, 107, 108, 109. An aqueous raffinate is withdrawn from fourth extraction stage 109 through offtake 111 and overflows weir 112 to exit the plant 101 via outlet pipe 113. An organic extractant (e.g. a 5% by volume "Alamine 336" solution in kerosene/2.5% by volume iso-decanol) is supplied to plant 101 through inlet pipe 114 at approximately one tenth the rate of supply of the aqueous uranium leach liquor through inlet 110. This extractant passes in counter-current to the aqueous stream through the four extraction stages in the order 109, 108, 107, 106 and the loaded extractant exits plant 101 via offtake pipe 115.

Each of the four extraction stages 106, 107, 108 and 109 is constructed as a mixer-settler and is similar in construction to the other extraction stages. Each has a mixing chamber 116 with an impeller 117 mounted therein on a vertical shaft 118. A motor (not shown) is provided on top of each extraction stage for driving the respective shaft 118 through suitable reduction gearing (not shown).

Beneath mixing chamber 116 in each extraction stage is a lower settling chamber 119; this is separated from mixing chamber 116 by means of a lower baffle 120 which extends horizontally across the extraction stage. As can be seen from FIG. 9, baffle 120 is of the "egg box" type and consists of two sets of plates 121, 122 secured to one another at right angles. Above mixing chamber 116 is an upper settling chamber 123 which is separated therefrom by means of an upper baffle 124 generally similar in construction to that of lower baffle 120. As with lower baffle 120, upper baffle 124 comprises two sets of parallel plates 125, 126 secured at right angles to one another. Baffles 120 and 124 serve to provide a plurality of pathways for liquid between the mixing chamber 116 and the respective settling chamber 119 or 123. The spacing between adjacent plates of the baffles 120 and 124 and the depth of these baffles are such that they serve to eliminate from liquid entering the respective settling chamber 119 or 123 from mixing chamber 116, most, if not all, of the rotational movement about the axis of shaft 118 produced by impeller 117. In this way liquid enters the settling chambers 119 and 123 in a substantially vertical direction and conditions conducive to disengagement of the phases are established in the settling chambers 119 and 123 despite turbulent mixing conditions in the adjacent mixing chamber 116.

In one corner of each mixer-settler section is formed a first compartment 127 of right-angled triangular section, the hypotenuse of which is formed by partition 128. A horizontal pipe 129 is mounted to partition 128 so as to communicate with conduit 127. At its free end pipe 129 debouches into a distributor box 130 having an open upper face and disposed below and adjacent impeller 117.

In the corner opposite to compartment 127 is formed a second compartment 131, also of right-angled, triangular section, whose hypotenuse is formed by partition 132. This latter compartment is arranged to feed a further horizontal pipe 133 which debouches into an upper distributor box 134. Distributor box 134 has an open lower face and is disposed above and adjacent impeller 117; shaft 118 passes through its upper face.

In a third one of the corners of each mixer-settler stage is formed a further triangular section compartment 135. The hypotenuse to this triangular section is formed by vertical partition 136. In a similar way the remaining corner of each mixer-settler stage has another compartment 137, the hypotenuse to which is formed by vertical partition 138.

Figure 13:
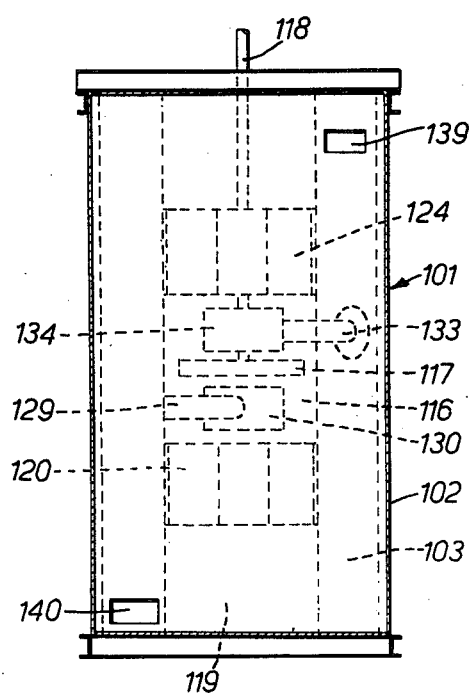
FIG. 13 is a section on the line J—J of FIG. 9.

As can be seen from FIG. 13, the wall between each adjacent pair of mixer-settler sections, for example the wall 103, is provided with a pair of apertures 139, 140. An aperture 141, corresponding to aperture 139 is formed in the partition 138 of each of extraction stages 107, 108, 109. In the partition 136 of each of extraction stages 106, 107, 108 there is an aperture 142 corresponding to aperture 140. The end wall 143 of extraction stage 106 has an aperture 144 (see FIG. 11) which provides communication between upper compartment 123 of first exraction stage 106 and an overflow catchpot 145 to which offtake pipe 115 is connected. The lower edge of aperture 144 lies at the same level as the lower edges of each of the apertures 139 and 141.

In operation of the plant, pregant uranium leach liquor enters first extraction stage 106 through inlet 110 and passes into a vertical conduit formed by compartment 127 of first extraction stage 106. It then flows through pipe 129 and distribution box 130 into the "eye" of impeller 117 in mixing chamber 116. Organic phase enters compartment 131 of first extraction stage 106 by passage over the weir, formed by the lower edge of aperture 139, from compartment 137 of second extraction stage 108, passes down through the vertical conduit formed by compartment 131 of first extraction stage 106, through pipe 133 and distribution box 134 and into the "eye" of impeller 117. Impeller 117 serves to disperse the phases one in the other so as to form a so-called "primary dispersion".

Dispersion passes through baffles 120 and 124 both downwardly and upwardly from mixing chamber 116. Disengagement of the phases occurs in the baffles and/or in the settling chambers 119 and 123. Disengaged heavier phase (i.e. aqueous phase) flows back from baffle 124 into mixing chamber 116, whilst disengaged lighter phase (i.e. kerosene phase) flows back from baffle 120 into mixng chamber 116.

Disengaged kerosene phase collects in upper settling chamber 119 and flows out over the weir formed by the lower edge of aperture 144 and thence to offtake pipe 115. Disengaged aqueous phase collects in lower settling chamber 119 and passes through aperture 142 into compartment 135 and thence through aperture 140 into compartment 127 of second extraction stage 107.

In second extraction stage 107 the aqueous phase flows in compartment 127 to pipe 129 and thence via distribution box 130 into the "eye" of impeller 117. The organic phase enters from third extraction stage 108 via aperture 139 in transverse wall 104, flows down compartment 131 and thence through pipe 133 and distribution box 134 to the impeller 117. Dispersion formation and disengagement takes place as described above in relation to first extraction stage 106. Disengaged organic phase flows from upper chamber 123 through aperture 141 into the compartment 137 and then overflows through aperture 139 into compartment 131 of the first extraction stage 106. Disengaged aqueous phase exits lower chamber 119 via apertures 142 and 140 to pass on to third extraction stage 107.

The flow pattern through third extraction stage 108 is similar to that in second extraction stage 107.

In fourth extraction stage 109 the organic phase enters compartment 131 via inlet pipe 114. Disengaged aqueous phase (raffinate) exits lower chamber 119 via offtake 111. Otherwise the flow paths of the aqueous and organic phases are as described for the earlier extraction stages.

As with the plant 1 of FIGS. 1 to 8, the static interface (with the impellers 117 stopped but with the liquors continuing to flow through the plant 101 at flow rates within the design capacity) is preferably selected so as to produce a dispersion of a phase ratio, e.g. about 1:1, that promotes mass transfer between the phases and minimises the risk of "secondary dispersion" formation.

As illustrated plants 1 and 101 are each arranged for counter-current flow of the two media between extraction stages. To operate the plant 1 under a co-current regime requires some modification. In this case downcomer pipe 38 is repositioned to run from compartment 43 to draught tube 41, aperture 44 is blanked off and an aperture similar to aperture 44 is formed in partition 36. Former inlet 12 now becomes the outlet for the organic liquor and a new inlet must be provided for lean organic liquor to compartment 43 of first extraction stage 7. Scrub stage 6 can be dispensed with or can be repositioned to receive organic liquid from compartment 37 of third extraction stage 9. To operate the plant 101 under a co-current regime also requires some modification. In this case pipe 133 is repositioned to run from compartment 137, aperture 141 is blanked off and an aperture similar to aperture 141 is formed in partition 132. Former inlet 114 now becomes the outlet for the organic liquor and a new inlet must be provided for lean organic liquor to compartment 137 of first extraction stage 106. Outlet catchpot 145 can be dispensed with.

It is an advantage of each of plants 1 and 101 that no exterior pipework is necessary. Furthermore since the plant is compact in construction it can be fabricated off site and transported as a unit to the plant site. Provided that the outside walls of tank 2 or 102 are leak-free, the presence of minor leaks between stages or from the various compartments within the individual stages is relatively unimportant and will not detract markedly from efficient operation of the plant. The internal partitions 34, 36, 42 and 45 or 128, 132, 136 and 138, besides providing the compartments at the corners of each extraction stage, also serve to strengthen the structure.

In the illustrated embodiments, the various weirs are shown fixed. It will usually be preferred, however, to make these weirs adjustable, i.e. by providing vertically adjustable plates whose upper edges form the respective weirs. V-notches may be provided, if desired, in these weirs for better flow control.

Similarly the illustrated "egg box" type baffles can be replaced by other forms of baffle, e.g. inclined plates or coalescer pads such as pads of "D.C. KnitMesh" (the word "KnitMesh" is a trade mark of KnitMesh Limited of Clements House, Station Approach, South Croydon, CR2 OYY; "D.C. KnitMesh" is a dual filament knitted mesh fabric knitted from side-by-side filaments of, for example, stainless steel and polypropylene.)

In each of the illustrated embodiments the various stages of the plant may be operated so that the dispersion is of the organic-in-aqueous (O/A) type or of the aqueous-in-organic (A/O) type. Some of the stages may be operated with one type of dispersion and some with the other or they may all be operated so that the same type of dispersion is formed in each. Usually it will be preferred to operate each stage under conditions such that the dispersed medium is the one supplied at the lower feed rate to that stage, i.e. in the case illustrated with an O/A-type dispersion in each stage. The reason for this will be discussed in more detail below.

In use of each of the illustrated forms of plant for uranium extraction the pregnant aqueous sulphuric acid leach liquor is supplied at a greater rate than the organic extractant. Typically the aqueous:organic feed rate ratio is about 10:1 by volume. The instantaneous volume ratio of the phases in the mixing chambers (and hence the phase ratio of the disperson) is, however, adjusted to be 1:1 by volume. A 1:1 by volume ratio dispersion thus flows both upwardly and downwardly into the upper and lower baffles. Thus, at a 10:1 by volume aqueous:organic feed ratio, for every 10 volumes of aqueous leach liquor supplied to the mixing chamber, 20 volumes of dispersion flow downward into the lower baffle, whilst 1 volume of organic extractant is supplied to the mixing chamber and 2 volumes of dispersion pass into the upper baffle. Of the 20 volumes of dispersion flowing into the lower baffle, 10 volumes of aqueous liquor disengage whilst 10 volumes of organic extractant, either wholly or partially disengaged, return to the mixing chamber. By operating under aqueous continuous conditions, i.e. with an O/A type dispersion in the mixing chamber, it is not necessary that the dispersed organic extractant should disengage completely before flowing back up into the mixing chamber from the lower baffle. Hence the organic extractant may return to the mixing chamber from the lower baffle still in droplet form, albeit as somewhat enlarged droplets. Of the 2 volumes of O/A type dispersion flowing into the upper baffle, 1 volume of organic extractant is coalesced completely whilst 1 volume of aqueous liquor flows back into the mixing chamber. Hence it is not necessary that the cross-sectional area of the lower baffle and the lower settling chamber provides sufficient settling area for complete disengagement of the 20 volumes of dispersion flowing into the lower baffle. Complete disengagement is only necessary for the dispersion flowing into the upper baffle. This means that the settler area can be greatly reduced compared with that of a conventional mixer settler operating at a 10:1 by volume aqueous:organic ratio and a 1:1 by volume mixing ratio with external recycle of organic extractant.

In effect the mixer-settler stages of the illustrated forms of apparatus each incorporate an automatic internal recycle of organic extractant (or whichever phase happens to be the one supplied at the lower rate). Besides requiring a smaller settling area than conventional apparatus (and hence potentially lower inventories of organic solvent and extractant chemical and potentially less hold-up of valuable materials in the plant) there is no need for an external recycle loop.

Although a 10:1 aqueous:organic feed rate ratio to the plants has been mentioned above, the relative flow rates of the two phases to the mixing chambers can be adjusted as desired within the design limits of the plant. Thus the flow rate ratio of the phases to the mixing chamber may vary within wide limits e.g. from about 100:1 or more to about 1:100 or less. Usually it will be preferred to operate at an aqueous phase:organic phase feed rate ratio of about 1:5 to about 40:1, e.g. about 10:1.

Although each of the illustrated forms of plant has been described as having four separate drive motors, i.e. one for each impeller drive shaft, it is possible to replace these four motors with a single motor driving a common horizontal drive shaft linked to the individual drive shafts through appropriate gearing. If four separate motors are used, it is advisable, in the event that one motor fails, to arrange for the remaining three motors to cut out automatically. By utilising a single motor and a common drive shaft, no such automatic shut down facility is required. If the motor fails all four impellers stop simultaneously.

At start-up, in order to ensure that a dispersion of the correct type is formed in each stage, the height of the static interface may be temporarily adjusted upwardly or downwardly (e.g. by temporarily interrupting the flow of one phase and/or by syphoning out some of the other phase) until the impeller lies in the chosen continuous medium. Upon starting the impeller a dispersion of the correct type will be formed and this same type of dispersion will continue to be formed after the feed rates of the phases have been returned to the design rates and the phase ratio in the mixing chamber is at the design figure.

The impellers may be of any suitable design, for example of the pump-mix type, of the marine impeller type, or of the turbine type. It is, however, preferred to use a modified form of double-shrouded pump-mix impeller with an open "eye" in both its upper and lower faces. The impeller and its rate of rotation should be so selected that shear conditions are produced in the mixing chamber conducive to formation of a "primary disperion" and preferably so that substantially all the mixing chamber is filled with dispersion.

Besides uranium extraction, the illustrated forms of plant can be used for any other suitable form of liquid-liquid extraction. Furthermore the plant is not restricted to the particular form of uranium extractant mentioned; any other conventional uranium extractant may be used. As Examples of other liquid-liquid extraction processes there can be mentioned extraction of other metals from suitable leach liquors (e.g extraction of copper from a pregnant aqueous, sulphuric acid-containing copper leach liquor with an organic extractant, such as a kerosene solution of Lix 64N or Acorga P5100). Moreover, although the illustrated forms of plant each include four mixer-settlers, it will be appreciated that the invention may equally well be practiced with two, three or five or more mixer-settlers.

It will be appreciated by those skilled in the art that in operation of each of the illustrated forms of plant, assuming that the weirs are set to produce, for example, a 1:1 aqueous:organic mixing ratio in each of the mixing chambers and that the aqueous and organic flow rates are within the design limits of the plant, this mixing ratio will be maintained automatically whatever the feed rate ratio of the media to the plant. Thus, even if the aqueous:organic feed rate ratio varies from 100:1 to 1:100, yet still the chosen mixing ratio of 1:1 will be maintained in the mixing chamber. It will be seen therefore that the system is self-balancing.

I claim:

1. Apparatus for effecting liquid-liquid contact in a plurality of stages between an aqueous liquid medium and an organic hydrophobic liquid medium capable of undergoing mass transfer with the aqueous liquid medium, comprising:
   a first mixer-settler;
   a second mixer-settler adjacent the first mixer-settler;
     each mixer-settler comprising:
       a mixing chamber;
       agitator means in the mixing chamber for mixing the aqueous and organic hydrophobic liquid media so as to form a dispersion of globules on one medium dispersed in the other, which globules are of a size such that, upon standing under gravity, the dispersion is capable of disengaging substantially completely into two separate layers;
       first conduit means for feeding the lighter medium of the two to the mixing chamber;
       second conduit means for feeding the heavier medium of the two to the mixing chamber;
       an upper settling chamber above the mixing chamber;
       a lower settling chamber below the mixing chamber;
       upper and lower baffle means extending across the mixer-settler so as to divide the mixing chamber from the upper settling chamber and the lower settling chamber respectively, each baffle means being adapted to provide a plurality of flow paths for liquid between the mixing chamber and the respective settling chamber and to permit maintenance in the respective settling chamber of conditions favouring dispersion disengagement despite turbulent mixing conditions in the mixing chamber;
       outlet means for disengaged heavier medium from the lower settling chamber; and
       offtake means for disengaged lighter medium from the upper settling chamber;
   means for supplying heavier medium to the first mixer-settler communicating with the second conduit means thereof;
   means for removing disengaged heavier medium from the second mixer-settler communicating with the outlet means therefrom;
   means for supplying lighter medium to one of the first and second mixer-settlers communicating with the first conduit means thereof; and
   means for removing disengaged lighter medium from the other one of the first and second mixer-settlers communicating with the offtake means thereof;
   the outlet means for disengaged heavier medium of the first mixer-settler being arranged to communicate directly with the second conduit means of the second mixer-settler so as to enable disengaged heavier medium from the first mixer-settler to pass directly to the second mixer-settler; and
   the offtake for lighter medium of the said one mixer-settler comprising a weir for lighter medium between the first and second mixer-settlers which is positioned adjacent the first conduit means of the said other mixer-settler so as to enable disengaged lighter medium to flow from the said one mixer-settler over the weir to the said other mixer-settler.

2. Apparatus according to claim 1, in which the first conduit means comprises a first downcomer means, the second conduit means comprises a second downcomer means, the outlet means for disengaged heavier medium comprises a riser, and the riser of the first mixer-settler is arranged to communicate with the second downcomer means of the second mixer-settler over a further weir.

3. Apparatus according to claim 1, in which the outlet means for disengaged heavier medium of the first mixer-settler comprises an aperture in the wall of the first mixer-settler through which disengaged heavier medium, in operation, may flow directly into the second conduit means of the second mixer-settler.

4. Apparatus according to claim 1, in which the offtake means for lighter medium of the second mixer-settler is arranged to discharge over the weir for lighter medium directly into the first conduit means of the first mixer-settler which is appropriately positioned relative thereto.

5. Apparatus according to claim 1, in which the first conduit means of the second mixer-settler is positioned to receive disengaged lighter medium flowing from the first mixer-settler over the weir for the lighter medium.

6. Apparatus according to claim 1, comprising an elongated tank housing substantially rectangular in plan, said housing comprising a floor, a pair of elongate side walls and a pair of end walls, and said housing further being internally divided by at least one transverse internal wall extending upwardly from said floor and between said elongate side walls so as to form at least two box sections in said housing, each said box section corresponding to a respective mixer-setting.

7. Apparatus according to claim 6, in which each box section is substantially square in plan.

8. Apparatus according to claim 6, in which each box section is provided with vertical partitions each extending across a corresponding corner thereof so as to strengthen the structure and provide vertically extending compartments and in which said first and second conduit means comprise respective vertically extending compartments.

9. Apparatus according to claim 6, in which said tank housing is divided transversely by at least two transverse partitions into at least three box sections.

* * * * *

UNITED STATES PATENT AND TRADEMARK OFFICE
CERTIFICATE OF CORRECTION

PATENT NO. : 4,268,484
DATED : May 19, 1981
INVENTOR(S) : Gavin

It is certified that error appears in the above–identified patent and that said Letters Patent are hereby corrected as shown below:

In column 1, line 14, "series in a multi-stage" should be "series. In a multi-stage".

In column 2, line 68, "lowe" should be "lower".

In column 6, lines 14 and 17, "passed" should be "passes".

In column 6, line 39, "thse" should be "those".

In column 7, line 52, "kerosne" should be "kerosene".

In column 10, line 1, "exraction" should be "extraction".

In column 11, line 62, "disperson" should be "dispersion".

Signed and Sealed this

Twenty-ninth Day of December 1981

[SEAL]

Attest:

Attesting Officer

GERALD J. MOSSINGHOFF

Commissioner of Patents and Trademarks